(12) United States Patent
Yamagishi et al.

(10) Patent No.: US 10,212,208 B2
(45) Date of Patent: Feb. 19, 2019

(54) CONTENT SUPPLY DEVICE, CONTENT SUPPLY METHOD, PROGRAM, AND CONTENT SUPPLY SYSTEM

(71) Applicant: SATURN LICENSING LLC, New York, NY (US)

(72) Inventors: Yasuaki Yamagishi, Kanagawa (JP); Masahito Mori, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 514 days.

(21) Appl. No.: 14/893,475

(22) PCT Filed: May 26, 2014

(86) PCT No.: PCT/JP2014/063794
§ 371 (c)(1),
(2) Date: Nov. 23, 2015

(87) PCT Pub. No.: WO2014/196392
PCT Pub. Date: Dec. 11, 2014

(65) Prior Publication Data
US 2016/0134680 A1 May 12, 2016

(30) Foreign Application Priority Data
Jun. 6, 2013 (JP) .................................. 2013-119511

(51) Int. Cl.
*G06F 15/16* (2006.01)
*H04L 29/08* (2006.01)
(Continued)

(52) U.S. Cl.
CPC .......... *H04L 67/02* (2013.01); *H04L 65/4076* (2013.01); *H04L 65/608* (2013.01);
(Continued)

(58) Field of Classification Search
CPC .... H04L 67/02; H04L 65/4076; H04L 65/608
(Continued)

(56) References Cited

U.S. PATENT DOCUMENTS

2013/0007814 A1* 1/2013 Cherian ............... H04L 65/605
725/62
2013/0013799 A1 1/2013 Keum et al.
(Continued)

FOREIGN PATENT DOCUMENTS

JP WO 2012/096353 A1 7/2012
JP WO 2012/096372 A1 7/2012
(Continued)

OTHER PUBLICATIONS

Extended European Search Report of EP Patent Application No. 14808290.2, dated Nov. 8, 2016, 08 pages.
(Continued)

*Primary Examiner* — Philip B Tran
(74) *Attorney, Agent, or Firm* — Oblon, McClelland, Maier & Neustadt, L.L.P.

(57) ABSTRACT

The present disclosure relates to a content supply device, a content supply method, a program, and a content supply system that make it possible to extend an adaptive streaming technique employing the DASH and supply content through a plurality of different delivery paths According to a first aspect of the present disclosure, there is provided a content supply device that supplies a plurality of pieces of streaming data that include content of a same subject and differ in an attribute according to an adaptive streaming technique, the content supply device including: a supply unit configured to supply the plurality of pieces of streaming data to a reception side via a plurality of different networks; and a metafile generating unit configured to generate a metafile including an acquisition destination of a manifest file in which a QoS
(Continued)

parameter for selecting the plurality of pieces of streaming data to be supplied by the reception side and a condition value of the QoS parameter are described and supply the metafile to the reception side. The present disclosure can be applied to a system that delivers content in a streaming manner.

16 Claims, 24 Drawing Sheets

(51) Int. Cl.
| | |
|---|---|
| H04N 21/2343 | (2011.01) |
| H04N 21/262 | (2011.01) |
| H04N 21/438 | (2011.01) |
| H04N 21/462 | (2011.01) |
| H04N 21/63 | (2011.01) |
| H04N 21/643 | (2011.01) |
| H04N 21/845 | (2011.01) |
| H04L 29/06 | (2006.01) |

(52) U.S. Cl.
CPC . *H04N 21/23439* (2013.01); *H04N 21/26258* (2013.01); *H04N 21/4381* (2013.01); *H04N 21/4622* (2013.01); *H04N 21/631* (2013.01); *H04N 21/64322* (2013.01); *H04N 21/8456* (2013.01)

(58) Field of Classification Search
USPC .................................................. 709/219, 231
See application file for complete search history.

(56) References Cited

U.S. PATENT DOCUMENTS

| | | | |
|---|---|---|---|
| 2013/0107786 A1* | 5/2013 | Lotfallah | H04L 65/1016 370/312 |
| 2013/0111028 A1 | 5/2013 | Kondrad et al. | |
| 2014/0040498 A1* | 2/2014 | Oyman | H04W 4/70 709/231 |
| 2014/0250230 A1* | 9/2014 | Brueck | H04L 65/607 709/226 |
| 2014/0258552 A1* | 9/2014 | Oyman | H04N 19/146 709/231 |
| 2015/0256861 A1* | 9/2015 | Oyman | H04N 21/2343 725/62 |

FOREIGN PATENT DOCUMENTS

| | | |
|---|---|---|
| JP | 2013-38766 A | 2/2013 |
| WO | 2013/048484 A1 | 4/2013 |
| WO | 2013/057315 A2 | 4/2013 |

OTHER PUBLICATIONS

European Office Action dated Oct. 17, 2017 in Patent Application No. 14 808 290.2, 6 pages.

Combined Chinese Office Action and Search Report dated Mar. 27, 2018 in Patent Application No. 201480030652.8 (with English language translation).

\* cited by examiner

FIG. 8

```
<MPD ......>
<Period ......>
<AdaptationSet>
<Representation ......>
......
<BaseURL>http://example.com/counter-10mn_avc_dash.mp4</BaseURL>
<SegmentList ......>
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

FIG. 9

```
<MPD ..... >
<Period ..... >
<AdaptationSet>
<Representation ..... >
<BaseURL serviceLocationAttributeUrl=" http://example.com/serviceLocationAttributes">.....</BaseURL>
 .........
</MPD>
```

FIG. 10

```xml
<xs:schema xmlns:xs="http://www.w3.org/2001/XMLSchema" elementFormDefault="qualified" attributeFormDefault="unqualified">
<xs:element name="a" type="DeliverySystemAttributesType"/>
<xs:complexType name="DeliverySystemAttributesType">
<xs:sequence>
<xs:element name="L3L4L5Address" type="L3L4L5AddressType" maxOccurs="unbounded"/>
<xs:element name="DeliverySystemIdentifier" type="xs:string" maxOccurs="unbounded"/>
<xs:element name="DeliverySystemDescriptor" type="xs:string" maxOccurs="unbounded"/>
<xs:element name="RequiredQoSParameter" type="RequiredQoSParameterType" maxOccurs="unbounded"/>
</xs:sequence>
</xs:complexType>
<xs:complexType name="L3L4L5AddressType">
<xs:attribute name="ipAddress" type="xs:string"/>
<xs:attribute name="port" type="xs:string"/>
<xs:attribute name="transportSessionId" type="xs:string"/>
</xs:complexType>
<xs:complexType name="RequiredQoSParameterType">
<xs:choice>
<xs:element name="requiredValue" type="RequiredValueType"/>
<xs:element name="requiredClass" type="RequiredClassType" maxOccurs="unbounded"/>
</xs:choice>
<xs:attribute name="parameterURI" type="xs:anyURI"/>
</xs:complexType>
<xs:complexType name="RequiredValueType">
<xs:attribute name="upperLimit" type="xs:string"/>
<xs:attribute name="lowerLimit" type="xs:string"/>
<xs:attribute name="just" type="xs:string"/>
</xs:complexType>
<xs:complexType name="RequiredClassType">
<xs:attribute name="class" type="xs:string"/>
</xs:complexType>
</xs:schema>
```

FIG. 12

| Syntax | Number of bits | Identifier |
|---|---|---|
| terrestrial_delivery_system_descriptor(){ | | |
|   descriptor_tag | 8 | uimsbf |
|   descriptor_length | 8 | uimsbf |
|   centre_frequency | 32 | uimsbf |
|   bandwidth | 3 | bslbf |
|   priority | 1 | bslbf |
|   Time_Slicing_indicator | 1 | bslbf |
|   MPE-FEC_indicator | 1 | bslbf |
|   reserved_future_use | 2 | bslbf |
|   constellation | 2 | bslbf |
|   hierarchy_information | 3 | bslbf |
|   code_rate-HP_stream | 3 | bslbf |
|   code_rate-LP_stream | 3 | bslbf |
|   guard_interval | 2 | bslbf |
|   transmission_mode | 2 | bslbf |
|   other_frequency_flag | 1 | bslbf |
|   reserved_future_use | 32 | bslbf |
| } | | |

FIG. 13

| DVB SATELLITE BROADCASTING/CABLE TELEVISION COMMON PARAMETER |
|---|
| System availability |
| Link availability |
| BER before RS decoder |
|   Out of service |
|   In service |
| Error events logging |
| Transmitter symbol clock jitter and accuracy |
| RF/IF signal power |
| Noise power |
| Bit error count after RS |
| IQ signal analysis |
|   Introduction |
|   Modulation Error Ratio (MER) |
|   System Target Error (STE) |
|   Carrier suppression |
|   Amplitude Imbalance (AI) |
|   Quadrature Error (QE) |
|   Residual Target Error (RTE) |
|   Coherent interferer |
|   Phase Jitter (PJ) |
|   Signal-to-Noise Ratio (SNR) |
| Interference |

FIG. 14

| PARAMETER FOR DVB CABLE TELEVISION |
|---|
| Cable specific measurements<br>  Noise margin<br>  Estimated noise margin<br>  Signal quality margin test<br>  Equivalent Noise Degradation (END)<br>  BER vs. $E_b/N_0$<br>  Phase noise of RF carrier<br>  Amplitude, phase and impulse response of the channel<br>  Out of band emissions |

FIG. 15

| PARAMETER FOR DVB SATELLITE BROADCASTING |
|---|
| Satellite specific measurements<br>  BER before Viterbi decoding<br>  Receive BER vs. $E_b/N_0$<br>  IF spectrum |

FIG. 16

| PARAMETER FOR TERRESTRIAL BROADCASTING (DVB-T) |
|---|
| RF frequency measurements |
|   RF frequency accuracy(Precision) |
|   RF channel width(Sampling Frequency Accuracy) |
|   Symbol Length measurement at RF(Guard Interval verification) |
| Selectivity |
| AFC capture range |
| Phase noise of local oscillators(LO) |
| RF/IF signal power |
| Noise power |
| RF and IF spectrum |
| Receiver sensitivity/dynamic range for a Gaussian channel |
| Equivalent Noise Degradation(END) |
|   Equivalent Noise Floor(ENF) |
| Linearity characterization(shoulder attenuation) |
| Power efficiency |
| Coherent interferer |
| BER vs. C/N ratio by variation of transmitter power |
| BER vs. C/N ratio by variation of Gaussian noise power |
| BER before Viterbi(inner)decoder |
| BER before RS(outer)decoder |
| BER after RS(outer)decoder |
| I/Q analysis |
|   N/A |
|   Modulation Error Ratio |
|   System Target Error |
|   Carrier Suppression |
|   Amplitude Imbalance |
|   Quadrature Error |
|   Phase Jitter |
| Overall signal delay |
| SFN synchronization |
|   MIP_timing_error |
|   MIP_structure_error |
|   MIP_presence_error |
|   MIP_pointer_error |
|   MIP_preriodicity_error |
|   MIP_ts_rate_error |
| System Error Performance |

FIG. 17

| PARAMETER FOR TERRESTRIAL BROADCASTING (DVB-T2) |
|---|
| RF frequency accuracy |
| RF occupied bandwidth |
| Selectivity |
| AFC capture range |
| Phase noise of Local Oscillators(LO) |
| RF/IF signal power |
| MISO Group Power Ratio |
| Noise Power |
| RF and IF spectrum |
| Receiver sensitivity/dynamic range for a Gaussian channel |
| Linearity characterization(shoulder attenuation) |
| Power efficiency |
| PAPR effect |
| P1 Symbol Error Rate |
| BER before LDPC(inner)decoder |
| Number of LDPC iterations |
| BER before BCH(outer)decoder |
| Baseband Frame Error Rate BBFER |
| Errored Second Ratio ESR |
| IQ signal analysis |
|   Modulation Error Ratio(MER) |
|   Signal to interference Noise Ratio(SINR) |
|   Carrier Suppression(CS) |
|   Carrier Phase |
|   Amplitude Imbalance(AI) |
|   Quadrature Error(QE) |
| SFN synchronisation |
| L1 signalling error |
| RMS Delay-Spread(RMS-DS) |
| Maximum Excess Delay(MED) |
| Receiver Buffer Model(RBM)validation test |
| Ralative power Level during the non_P1 part of the FEF (RLF_non_P1) |

FIG. 18

| PARAMETER FOR CABLE TELEVISION (DVB-C2) |
|---|
| RF frequency accuracy |
| RF Sampling frequency |
| AFC capture range |
| Phase noise of Local Oscillators(LO) |
| RF/IF signal power |
| Noise Power |
| RF and IF spectrum |
| Receiver sensitivity/dynamic range for a Gaussian channel |
| Linearity characterization(shoulder attenuation) |
| BER before LDPC(inner)decoder |
| Number of LDPC iterations |
| BER before BCH(outer)decoder |
| Baseband Frame Error Rate BBFER |
| IQ signal analysis |
| Modulation Error Ratio(MER) |
| Amplitude Imbalance(AI) |
| Quadrature Error(QE) |
| L1 signalling error |
| Receiver Buffer Model(RBM)validation test |

FIG. 19

| PARAMETER FOR OTHER TERRESTRIAL BROADCASTING |
|---|
| channel id, according to Annex B.2 |
| centre frequency |
| signal strength(dBm or dBμV) |
| signal strength indicator, SSI(%), according to section 3.4.4.6 |
| signal quality indicator, SQI(%), according to section 3.4.4.7 |
| C/N(dB) |
| BER before Reed Solomon decoding(DVB-T) or BCH decoding(DVB-T2) |
| Uncorrected packets |

FIG. 20

| PARAMETER FOR 3G MOBILE PHONE (FREQUENCY DIVISION MULTIPLEXING) (UTRA FDD) TERMINAL |
|---|
| UE measurement abilities<br>  CPICH RSCP<br>  PCCPCH RSCP<br>  UTRA carrier RSSI<br>  GSM carrier RSSI<br>  CPICH Ec/No<br>  Transport channel BLER<br>  UE transmitted power<br>  SFN-CFN observed time difference<br>  SFN-SFN observed time difference<br>  UE Rx-Tx time difference<br>  Void<br>  UE GPS Timing of Cell Frames for UE positioning<br>  UE GPS code phase<br>  UE transmission power headroom<br>  UE GANSS Timing of Cell Frames for UE positioning<br>  UE GANSS code measurements<br>  E-UTRA RSRP<br>  Void<br>  E-UTRA RSRQ |

FIG. 21

| PARAMETER FOR 3G MOBILE PHONE (TIME DIVISION MULTIPLEXING) (UTRA TDD) TERMINAL |
|---|
| UE measurement abilities |
| P-CCPCH RSCP |
| CPICH RSCP |
| Timeslot ISCP |
| UTRA carrier RSSI |
| GSM carrier RSSI |
| SIR |
| CPICH Ec/No |
| Transport channel BLER |
| UE transmitted power |
| SFN-SFN observed time difference |
| SFN-GFN observed time difference |
| Observed time difference to GSM cell |
| UE GPS Timing of Cell Frames for UE positioning |
| Timing Advance($T_{ADV}$) for 1.28Mcps TDD |
| UE GPS code phase |
| UE transmission power headroom(1.28Mcps option only) |
| UE transmission power headroom(3.84Mcps and 7.68Mcps options) |
| E-UTRA RSRP |
| E-UTRA RSRQ |

FIG. 22

| PARAMETER FOR LTE(E-UTRA) TERMINAL |
|---|
| UE measurement capabilities<br>  Reference Signal Received Power(RSRP)<br>  Void<br>  Reference Signal Received Quality(RSRQ)<br>  UTRA FDD CPICH RSCP<br>  UTRA FDD carrier RSSI<br>  UTRA FDD CPICH Ec/No<br>  GSM carrier RSSI<br>  Void<br>  UTRA TDD P-CCPCH RSCP<br>  CDMA2000 1x RTT Pilot Strength<br>  CDMA2000 HRPD Pilot Strength<br>  Reference signal time difference(RSTD)<br>  UE GNSS Timing of Cell Frames for UE positioning<br>  UE GNSS code measurements<br>  UE Rx - Tx time difference |

FIG. 23

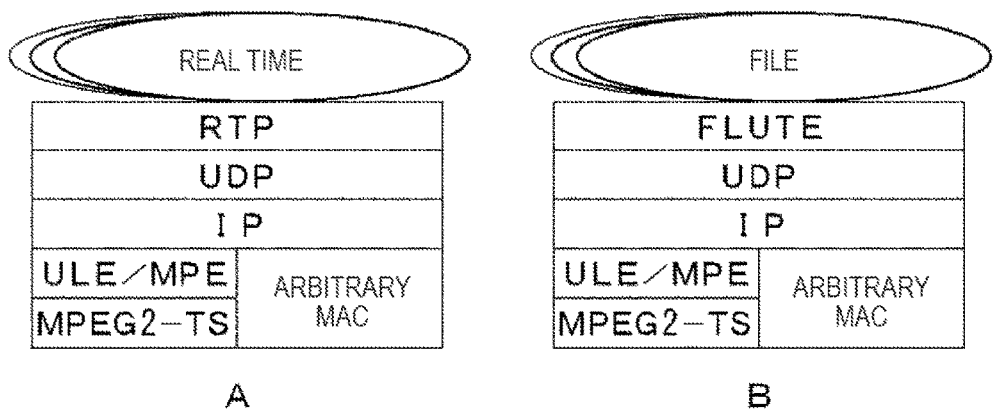

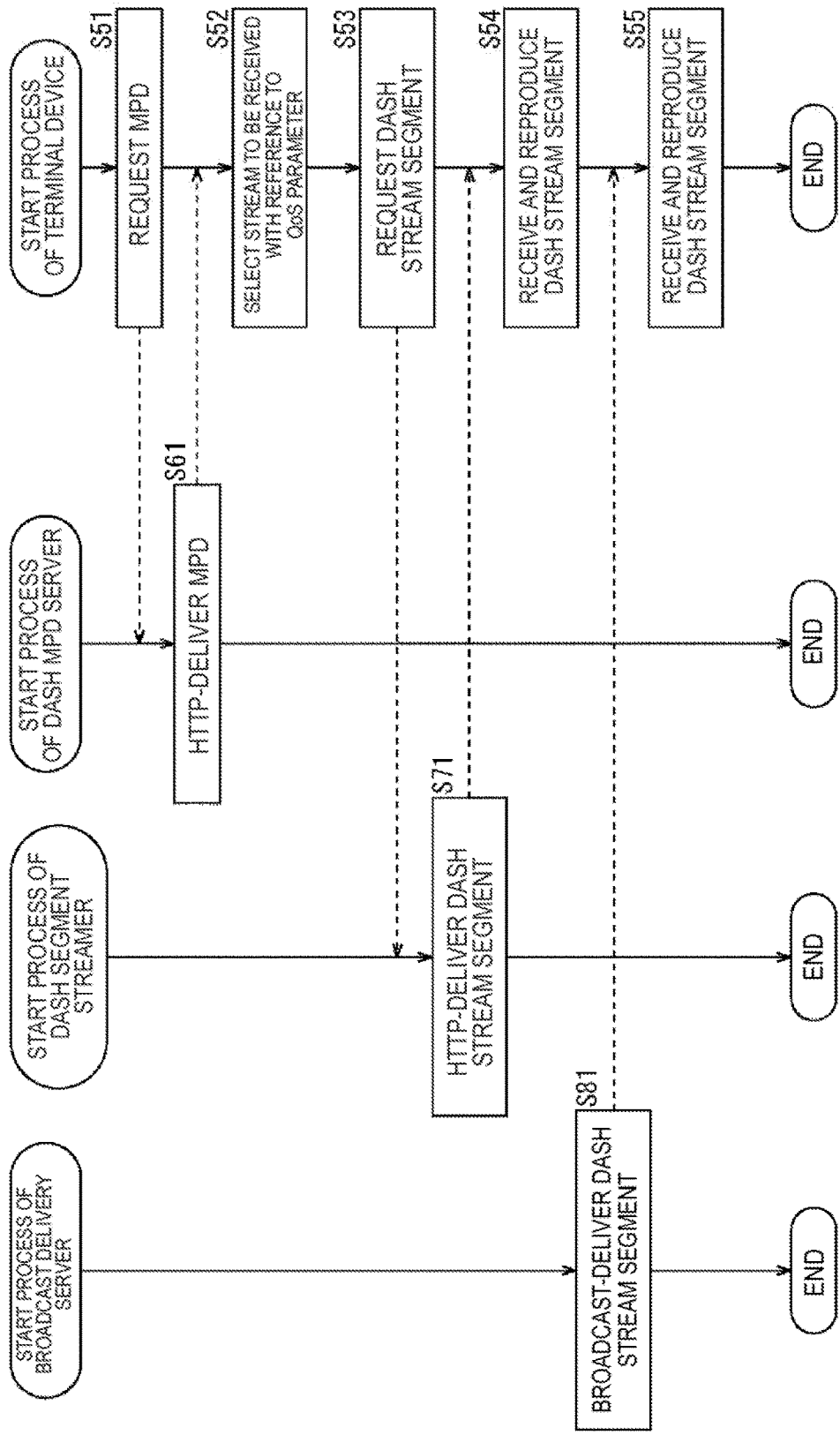

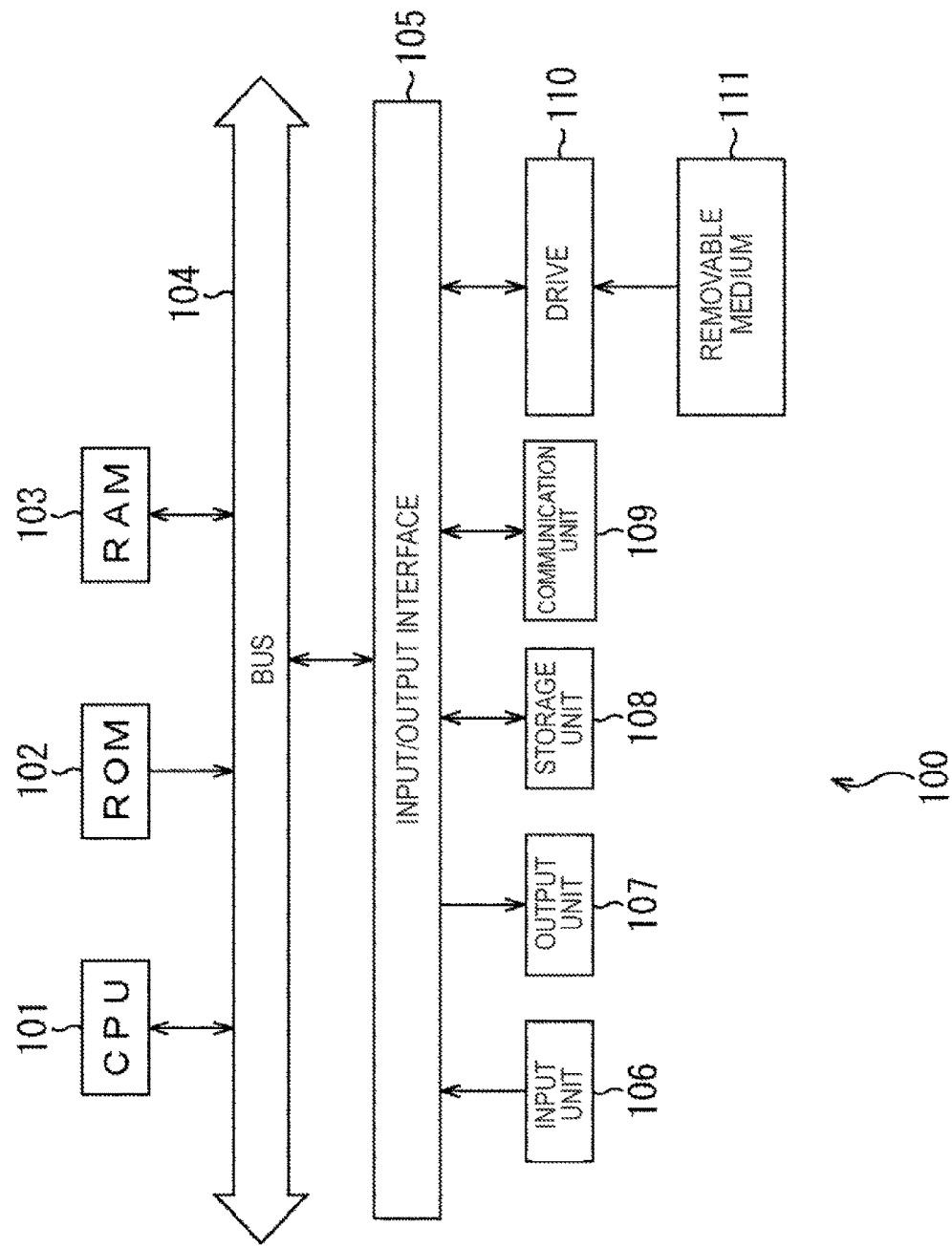

CONTENT SUPPLY DEVICE, CONTENT SUPPLY METHOD, PROGRAM, AND CONTENT SUPPLY SYSTEM

TECHNICAL FIELD

The present disclosure relates to a content supply device, a content supply method, a program, and a content supply system, and more particularly, to a content supply device, a content supply method, a program, and a content supply system, which are suitably applicable when content of the same subject is supplied through a plurality of delivery paths.

BACKGROUND ART

Moving Picture Experts Group-Dynamic Adaptive Streaming over HTTP (hereinafter, referred to as "DASH") (MPEG-DASH) using the same HTTP as browsing of a web site as an internationally standardized moving image delivery protocol available for moving image delivery via the Internet has been known (for example, see Non-Patent Literature 1).

In the DASH, an adaptive streaming technique is implemented. In other words, a content supply side is configured to prepare a plurality of streams in which content of the same subject is included, and an image quality, an angle of view size, or the like changes according to a communication environment of the Internet serving as a path or a capability or a state of a reception side. On the other hand, the reception side can select an optimal stream according to the communication environment of the Internet, the capability or the state of the reception side, or the like among the plurality of streams prepared by the supply side and acquire and reproduce the selected optimal stream.

As described above, in the DASH, a metafile called a media presentation description (MPD) is supplied from the supply side to the reception side so that the reception side can adaptively select and acquire a stream.

An address (url information) of streaming data (media data such as audio/video/subtitle) divided into chunks is described in the MPD, and thus the reception side can access a predetermined server serving as a content supply source based on the url information and acquire and reproduce HTTP-delivered streaming data.

FIG. 1 illustrates an example of a configuration of a content supply system that delivers content in a streaming manner based on the DASH.

A content supply system 10 is configured with a content management server 11, a DASH segment streamer 12, a DASH MPD server 13, a cache server 15, and a DASH client 17.

The content management server 11 manages content supplied to the DASH client 17, generates a plurality of pieces of streaming data having different bit rates from content of the same subject, and outputs the generated streaming data to the DASH segment streamer 12. The DASH segment streamer 12 temporally divides streaming data of content into segments, holds each of the segments as a file, and notifies the DASH MPD server 13 of an address of a supply source of the files. Further, the DASH segment streamer 12 HTTP-delivers the file of the segmented streaming data in response to a request from the DASH client 17 of the reception side as an HTTP server.

The DASH MPD server 13 generates an MPD in which, for example, an address indicating a supply source of files of a plurality of pieces of segmented streaming data is described, and HTTP-delivers the MPD according to the request from the DASH client 17 of the reception side.

The cache server 15 present on the Internet caches the HTTP-delivered MPD, the file of the segmented streaming data, or the like. Then, when a request to transmit the cached MPD, the file of the cached segmented streaming data is transmitted from the DASH client 17-2 to the DASH MPD server 13 or the DASH segment streamer 12, the cached MPD or the cached segmented streaming data is HTTP-delivered to the DASH client 17-2 instead.

The DASH client 17 acquires the MPD from the DASH MPD server 13, selects a stream suitable for a current situation among a plurality of streams prepared by the DASH segment streamer 12 based on the acquired MPD, transmits a request to the DASH segment streamer 12, and receives and reproduces a file that is HTTP-delivered according to the request.

CITATION LIST

Non-Patent Literature

Non-Patent Literature 1: Mitsuhiro Hirabayashi, "Achieving Uninterrupted Video Streaming Using Existing Web Servers," NIKKEI ELECTRONICS, Mar. 19, 2012

SUMMARY OF INVENTION

Technical Problem

As described above, in the DASH, an adaptive streaming technique using HTTP delivery via the Internet is implemented.

By the way, when the reception side can acquire and reproduce a stream that is broadcast-delivered in a broadcast manner via various broadcasting networks (a terrestrial broadcasting network, a satellite broadcasting network, a mobile communication network, a wireless LAN such as Wi-Fi, and the like) or a stream that is multicast-delivered via the Internet as well, it is desirable to supply a stream using a delivery path thereof and enable the reception side to adaptively select a stream.

However, in the DASH, only HTTP delivery of streaming data of content is considered, and neither broadcast delivery nor multicast delivery is considered.

Thus, since there is not technique of describing a stream that is broadcast-delivered or multicast-delivered even in the MPD specified in the DASH, in order to describe a stream that is broadcast-delivered or multicast-delivered, it is necessary to extend the MPD.

Further, when the MPD is extended, if it is possible to describe a parameter related to a Quality Of Service (QoS) of each of various paths for delivering content, this is helpful when the reception side selects a stream.

The present disclosure was made in light of the foregoing, and it is desirable to extend an adaptive streaming technique employing the DASH and supply content through a plurality of different delivery paths.

Solution to Problem

According to a first aspect of the present disclosure, there is provided a content supply device that supplies a plurality of pieces of streaming data that include content of a same subject and differ in an attribute according to an adaptive streaming technique, the content supply device including: a supply unit configured to supply the plurality of pieces of streaming data to a reception side via a plurality of different networks; and a metafile generating unit configured to generate a metafile including an acquisition destination of a manifest file in which a QoS parameter for selecting the plurality of pieces of streaming data to be supplied by the reception side and a condition value of the QoS parameter are described and supply the metafile to the reception side.

The metafile generating unit can generate an extended MPD as the metafile.

The plurality of different networks can include at least one of the Internet, a terrestrial broadcasting network, a satellite broadcasting network, a cable television broadcasting network, a mobile broadcasting network, and a wireless LAN.

The metafile can be supplied to the reception side by HTTP delivery, FLUTE delivery, or broadcast delivery via the network.

According to the first aspect of the present disclosure, there is provided a content supply method of a content supply device that supplies a plurality of pieces of streaming data that include content of a same subject and differ in an attribute according to an adaptive streaming technique, the content supply method including: a supply step of supplying the plurality of pieces of streaming data to a reception side via a plurality of different networks through the content supply device; and a metafile generating step of generating a metafile including an acquisition destination of a manifest file in which a QoS parameter for selecting the plurality of pieces of streaming data to be supplied by the reception side and a condition value of the QoS parameter are described and supplying the metafile to the reception side through the content supply device.

According to the first aspect of the present disclosure, there is provided a program causing a computer that supplies a plurality of pieces of streaming data that include content of a same subject and differ in an attribute according to an adaptive streaming technique to function as: a supply unit configured to supply the plurality of pieces of streaming data to a reception side via a plurality of different networks; and a metafile generating unit configured to generate a metafile including an acquisition destination of a manifest file in which a QoS parameter for selecting the plurality of pieces of streaming data to be supplied by the reception side and a condition value of the QoS parameter are described and supply the metafile to the reception side.

In the first aspect of the present disclosure, a plurality of pieces of streaming data are supplied to a reception side via a plurality of different networks, and a metafile including an acquisition destination of a manifest file in which a QoS parameter for selecting the plurality of pieces of streaming data to be supplied by the reception side and a condition value of the QoS parameter are described is generated and supplied to the reception side.

According to a second aspect of the present disclosure, there is provided a content supply system including: a content supply device configured to supply a plurality of pieces of streaming data that include content of a same subject and differ in an attribute according to an adaptive streaming technique; and a terminal device configured to receive the stream data. The content supply device includes a supply unit configured to supply the plurality of pieces of streaming data to the terminal device via a plurality of different networks, and a metafile generating unit configured to generate a metafile including an acquisition destination of a manifest file in which a QoS parameter for selecting the plurality of pieces of streaming data to be supplied by the terminal device and a condition value of the QoS parameter are described and supply the metafile to the reception side. The terminal device acquires the manifest file based on the acquired metafile, and selects streaming data to be received based on the QoS parameter and the condition value of the QoS parameter described in the manifest file.

In the second aspect of the present disclosure, a content supply device supplies a plurality of pieces of streaming data a reception side via a plurality of different networks, generates a metafile including an acquisition destination of a manifest file in which a QoS parameter for selecting the plurality of pieces of streaming data to be supplied by the reception side and a condition value of the QoS parameter are described, and supplies the metafile to the reception side. A terminal device acquires the manifest file based on the acquired metafile, and selects streaming data to be received based on the QoS parameter and the condition value of the QoS parameter described in the manifest file.

Advantageous Effects of Invention

According to the first aspect of the present disclosure, it is possible to supply content through a plurality of different delivery paths.

According to the second aspect of the present disclosure, it is possible to extend an adaptive streaming technique employing the DASH and supply content through a plurality of different delivery paths.

BRIEF DESCRIPTION OF DRAWINGS

FIG. 8 is a diagram illustrating an example in which a structure below a representation is described in an XML format.

FIG. 9 is a diagram illustrating a structure of an extended MPD.

FIG. 10 is a diagram illustrating an example of an XML Schema of a ServiceLocation element designated by a serviceLocationAttributeUrl attribute.

FIG. 12 is a diagram illustrating an example of a tuning parameter.

FIG. 13 is a diagram illustrating an example of a QoS parameter of DVB satellite broadcasting/cable television.

FIG. 14 is a diagram illustrating an example of a QoS parameter of DVB cable television.

FIG. 15 is a diagram illustrating an example of a QoS parameter of DVB satellite broadcasting.

FIG. 16 is a diagram illustrating an example of a QoS parameter of terrestrial broadcasting (DVB-T).

FIG. 17 is a diagram illustrating an example of a QoS parameter of terrestrial broadcasting (DVB-T2).

FIG. 18 is a diagram illustrating an example of a QoS parameter of cable television (DVB-C2).

FIG. 19 is a diagram illustrating an example of a QoS parameter of other terrestrial broadcasting.

FIG. 20 is a diagram illustrating an example of a QoS parameter for a 3G mobile phone (UTRA FDD) terminal.

FIG. 21 is a diagram illustrating an example of a QoS parameter for a 3G mobile phone (UTRA TDD) terminal.

FIG. 22 is a diagram illustrating an example of a QoS parameter for an LTE (E-UTRA) terminal.

FIG. 23 is a diagram illustrating a streaming protocol stack.

FIG. 25 is a flowchart for describing an operation of a content supply system.

FIG. 26 is a block diagram illustrating an exemplary configuration of a computer.

DESCRIPTION OF EMBODIMENTS

Hereinafter, preferred modes (hereinafter, referred to as "embodiments") for carrying out the present disclosure will be described in detail with reference to the appended drawings.

[Exemplary Configuration of Content Supply System]

A content supply system according to an embodiment of the present disclosure implements adaptive streaming in which content is supplied through a plurality of different delivery paths.

Specifically, the MPD in the DASH is extended to describe various kinds of broadcasting networks as well as the Internet, and describes a reference value of a QoS parameter necessary when each delivery path is selected, and reception is performed. As a result, the reception side can receive and reproduce an optimal content stream according to a reception environment or a decoding capability of the reception side or the like.

Figure 1:
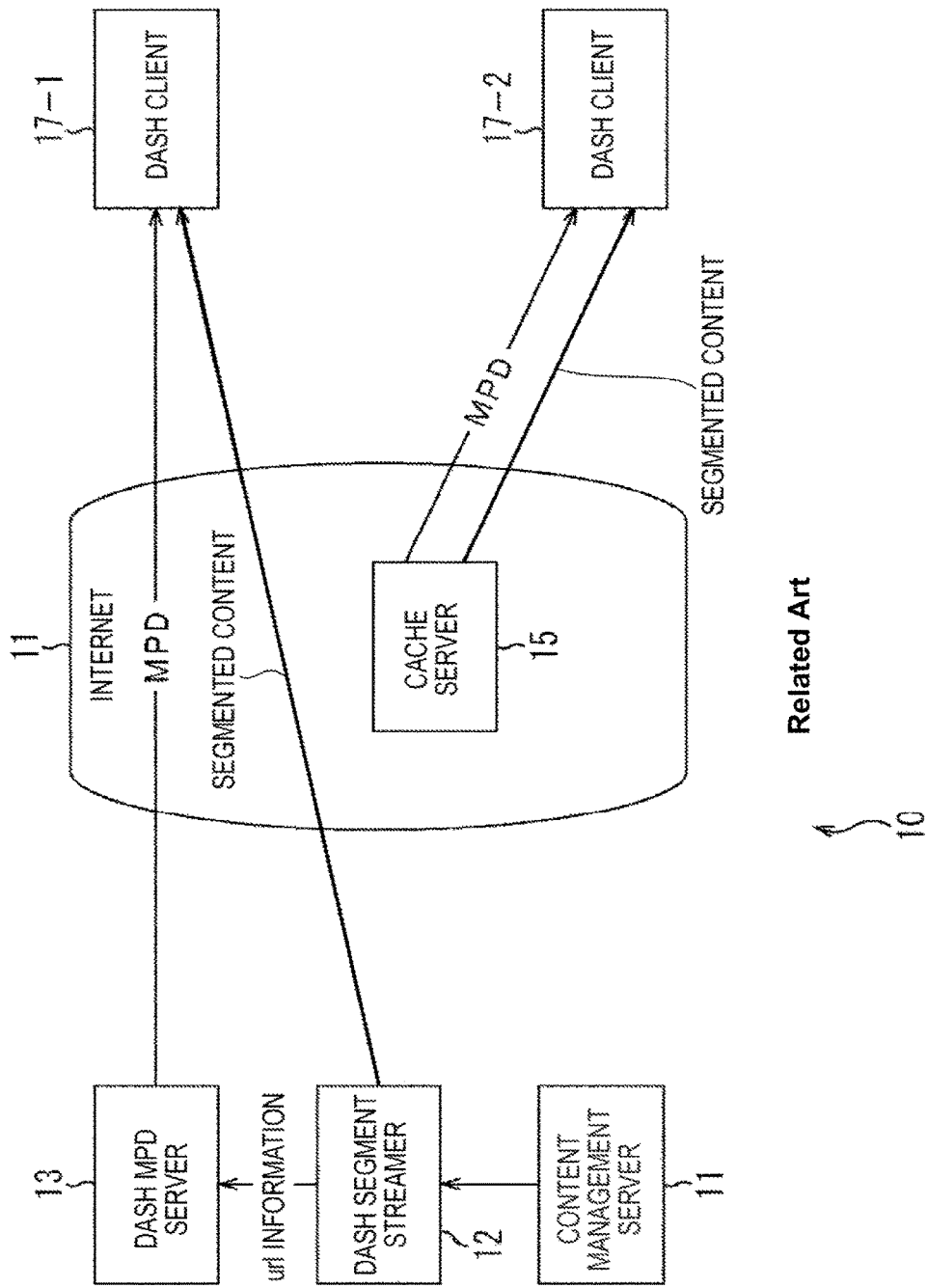
FIG. 1 is a block diagram illustrating an example of a configuration of a content supply system of the related art.
Figure 2:
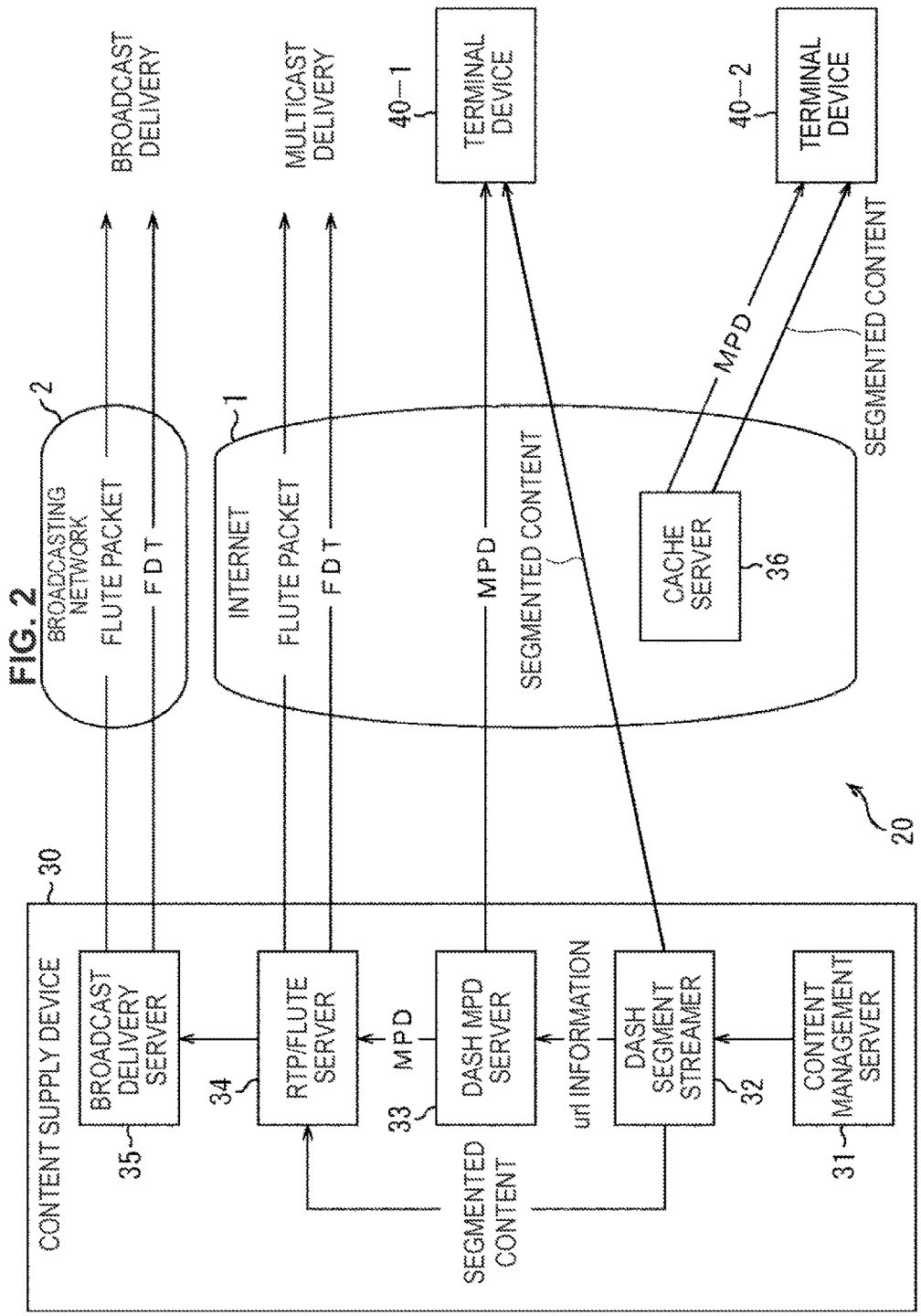
FIG. 2 is a block diagram illustrating an exemplary configuration of a content supply system to which the present disclosure is applied.

FIG. 2 illustrates an exemplary configuration of a content supply system according to an embodiment of the present disclosure.

A content supply system 20 is configured with a content supply device 30 and a terminal device 40.

The content supply device 30 includes a content management server 31, a DASH segment streamer 32, a DASH MPD server 33, an RTP/RTP/FLUTE server 34, and a broadcast delivery server 35.

The content management server 31 manages content (including live broadcasting content) to be supplied to the terminal device 40 of the reception side, generates a plurality of pieces of streaming data having different bit rates from content of the same subject, and outputs the generated streaming data to the DASH segment streamer 32.

Figure 3:
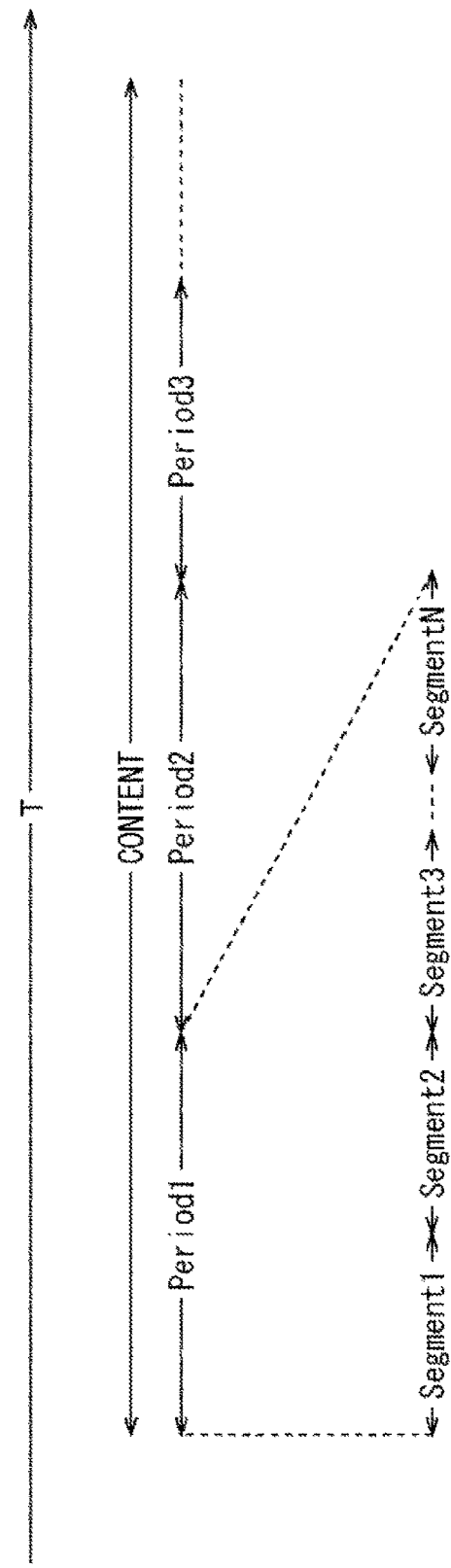
FIG. 3 is a diagram for describing temporal delimiting of content.

The DASH segment streamer 32 temporally delimits the streaming data of content into periods, divides each period into segments, and holds each segment as a file as illustrated in FIG. 3. The DASH segment streamer 32 notifies the DASH MPD server 33 and the RTP/FLUTE server 34 of an address serving as a supply source of the held files. The DASH segment streamer 32 supplies the files of the segmented streaming data to the RTP/FLUTE server 34. The DASH segment streamer 32 unicast-delivers the files of the segmented streaming data via the Internet 1 according to the HTTP in response to a request from the terminal device 40.

The DASH MPD server 33 generates an MPD necessary for receiving the streaming data of content supplied via a plurality of different delivery paths, and unicast-delivers the MPD via the Internet 1 according to the HTTP in response to a request from the terminal device 40. The DASH MPD server 33 supplies the generated MPD to the RTP/FLUTE server 34. The generated MPD is HTTP-delivered from the DASH MPD server 33 but may be multicast-delivered from the RTP/FLUTE server 34 or broadcast-delivered from the broadcast delivery server 35.

The RTP/FLUTE server 34 generates an FLUTE packet (for example, an asynchronous layered coding (ALC) packet) storing the file of the segmented streaming data, generates an FDT based on the MPD, and multicast-delivers the FLUTE packet and the FDT via the Internet 1 according to an FLUTE protocol. The RTP/FLUTE server 34 supplies the FLUTE packet and the FDT to the broadcast delivery server 35.

The broadcast delivery server 35 broadcast-delivers the FLUTE packet and the FDT supplied from the RTP/FLUTE server 34 via a broadcasting network 2. Examples of the broadcasting network 2 include a terrestrial broadcasting network, a satellite broadcasting network, a CATV network, and a mobile communication network. Hereinafter, in the present specification, a term "multicast delivery" is assumed to include a meaning of "broadcast delivery" via the broadcasting network 2.

A cache server 36 installed on the Internet 1 caches the MPD, the files of the segmented streaming data, the FDT, the FLUTE packet, and the like that are HTTP-delivered and multicast-delivered via the Internet 1. Then, when a request to transmit the cached MPD and the like is transmitted from the terminal device 40 to the DASH MPD server 33 or the like, the cached MPD and the like are HTTP-delivered to the terminal device 40 of the request source instead.

[Overview of MPD]

Next, an overview of the MPD will be described with reference to FIGS. 4 and 5.

Figure 4:
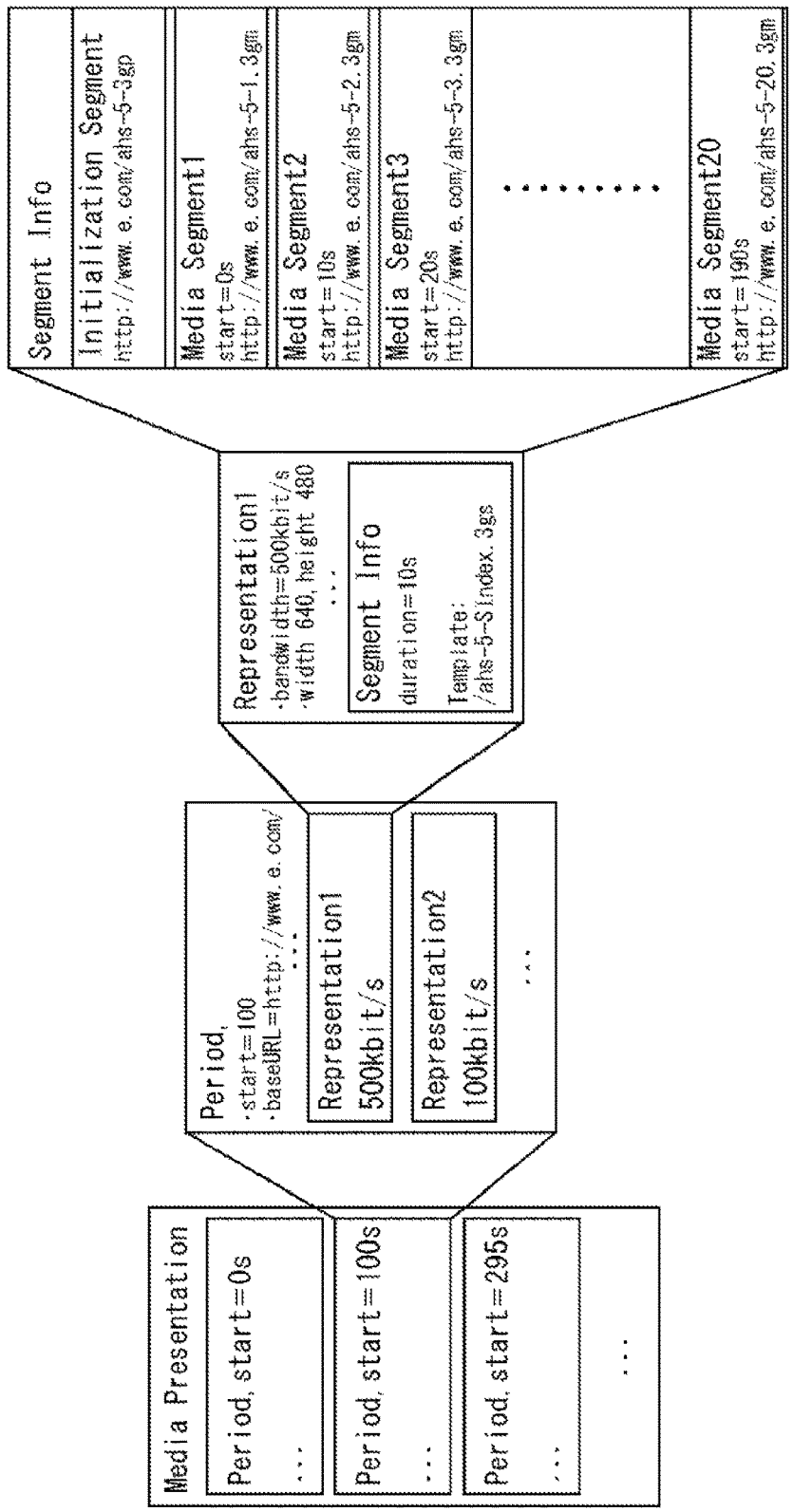
FIG. 4 is a diagram illustrating a configuration of an MPD.
Figure 5:
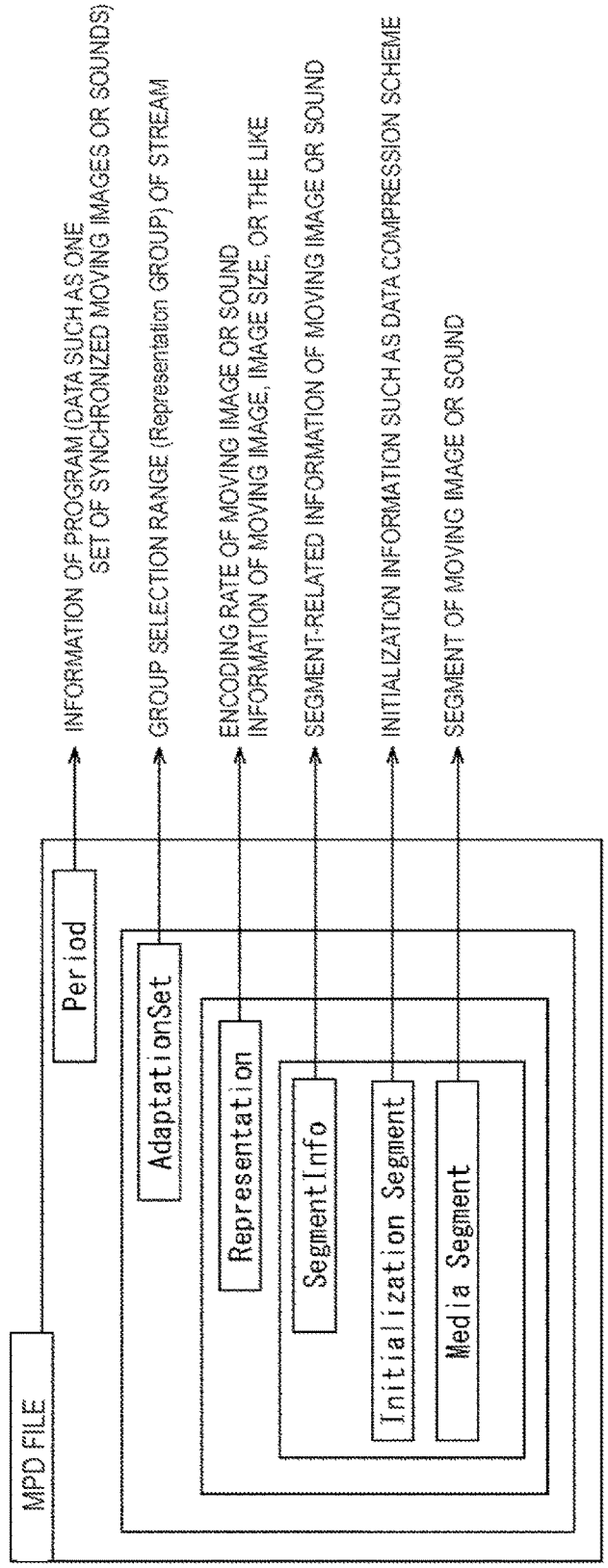
FIG. 5 is a diagram illustrating a hierarchical structure below a period in an MPD.

FIG. 4 illustrates a data configuration of the MPD. FIG. 5 illustrates a hierarchical structure below a period in the MPD.

In the MPD, information related to content (Media) is divided into units of periods. In each period, a plurality of representations including information related to streaming data of the same subject that differs in an image quality or an angle of view size and differs in a stream attribute such as a bit rate are prepared. The representation stores information related to a segment obtained by further temporally dividing a period.

Figure 6:
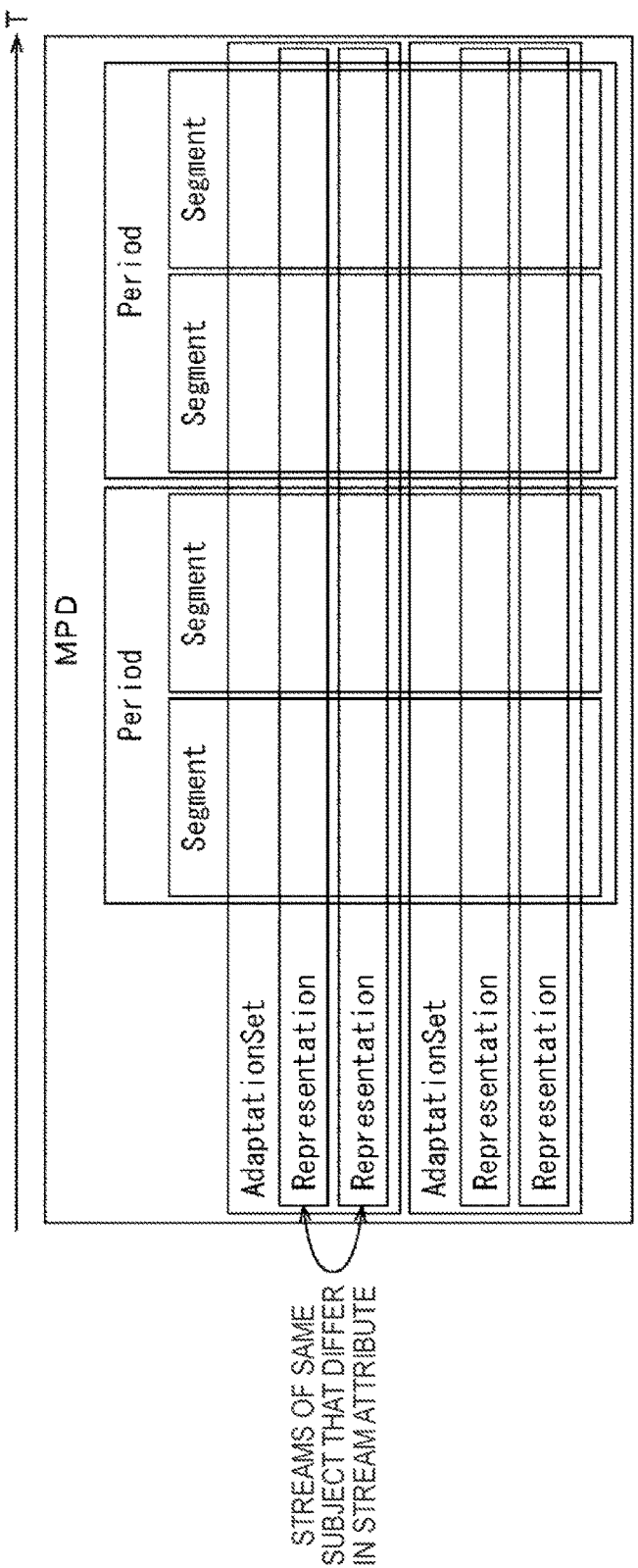
FIG. 6 is a diagram illustrating a state in which a configuration of an MPD is arranged on a time axis.

FIG. 6 illustrates a state in which a structure of the MPD is arranged on a time axis. As can be understood from FIG. 6, since there are a plurality of representations for the same segment, the terminal device 40 can adaptively select any of the representations in units of segments according to the communication environment, the decoding capability of the terminal device 40, or the like and acquire and reproduce appropriate stream data.

Figure 7:
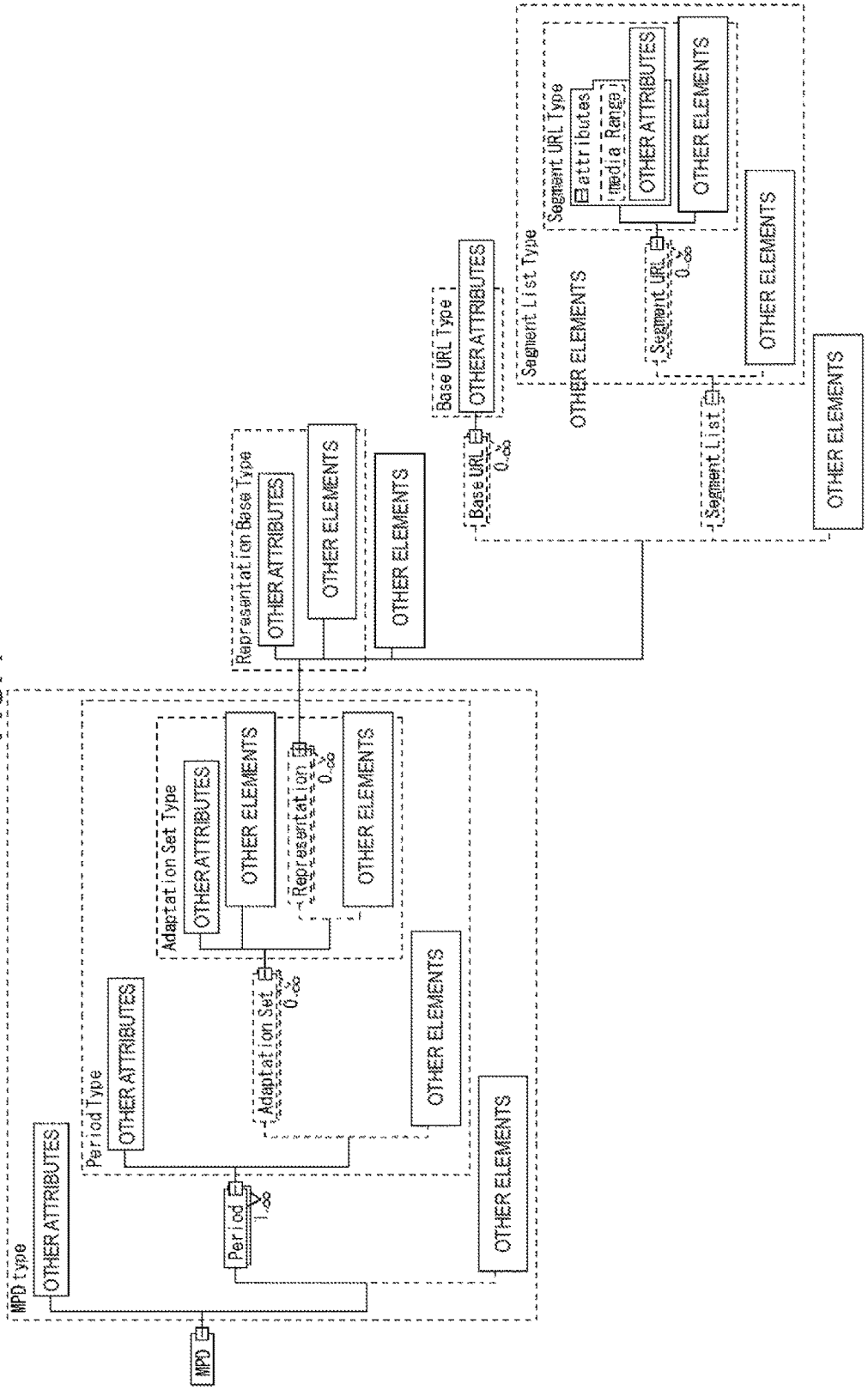
FIG. 7 is a diagram illustrating a detailed structure below a representation of an MPD.

FIG. 7 illustrates a structure below the representation of the MPD. An address of the supply source of the file storing the segmented stream data is described in the representation. Specifically, when a plurality of pieces of segmented stream data are individually held as files, a sequence of addresses (url information) of supply sources of the respective files is described. Further, when a plurality of pieces of segmented stream data are collectively held as one file, an address (Base URL) of a supply source of the file and a sequence of ranges (mediaRange) of segments in the file are described. FIG. 7 illustrates the latter case.

FIG. 8 illustrates an example in which the structure below the representation illustrated in FIG. 7 is described in an XML format.

In FIG. 8, "http://example.com/counter-10 mn_avc_dash.mp4" described in MPD/Period/AdaptationSet/Representation/BaseURL indicates the address of the supply source of the file into which a plurality of segments are collectively converted.

MPD/Period/AdaptationSet/Representation/SegmentList/SegmentURL/@m ediaRange indicates a byte range of the segmented stream data in the file.

For example, MPD/Period/AdaptationSet/Representation/SegmentList/SegmentURL/@mediaRange="795-83596" indicates that the byte range of a 795-th byte to an 83596-th byte in the file is first segmented stream data.

Thus, when the terminal device 40 acquires first segmented stream data, it is desirable to designate the mediaRange "795-83596" to a range header together with a url "http://example.com/counter-10 mn_avc_dash.mp4" of the file and issue an HTTP request. At this time, the HTTP request is as follows:
GET /counter-10 mn_avc_dash.mp4 HTTP/1.1
Host: example.com
Range: bytes=795-83596

Further, for example, in order to acquire second segmented stream data, it is desirable to designate the mediaRange "83597-166046" together with the url "http://example.com/Servicer/counter-10 mn_avc_dash.mp4" of the file and issue an HTTP request. At this time, the HTTP request is as follows:
GET /counter-10 mn_avc_dash.mp4 HTTP/1.1
Host: example.com
Range: bytes=83597-166046

[Extension of MPD]

In the present embodiment, the MPD is extended to describe various kinds of broadcasting networks as well as the Internet as a delivery path of a content stream and describe a reference value of a QoS parameter necessary for selecting each delivery path and performing reception.

Specifically, a ServiceLocation element in which a tuning parameter (DeliverySystemAttributes) and an IP multicast address (IPMulticastAddress) are described is introduced as a new element for receiving an IP multicast stream in which a group of segment files are transferred. Further, a serviceLocationAttribute Url attribute for describing a url of a serviceLocationAttribute file in which the ServiceLocation element is stored as a root element is introduced into the MPD.

FIG. 10 illustrates an example of an XML schema of the ServiceLocation element stored in a ServiceLocation file designated by the serviceLocationAttributeUrl attribute.

Figure 11:
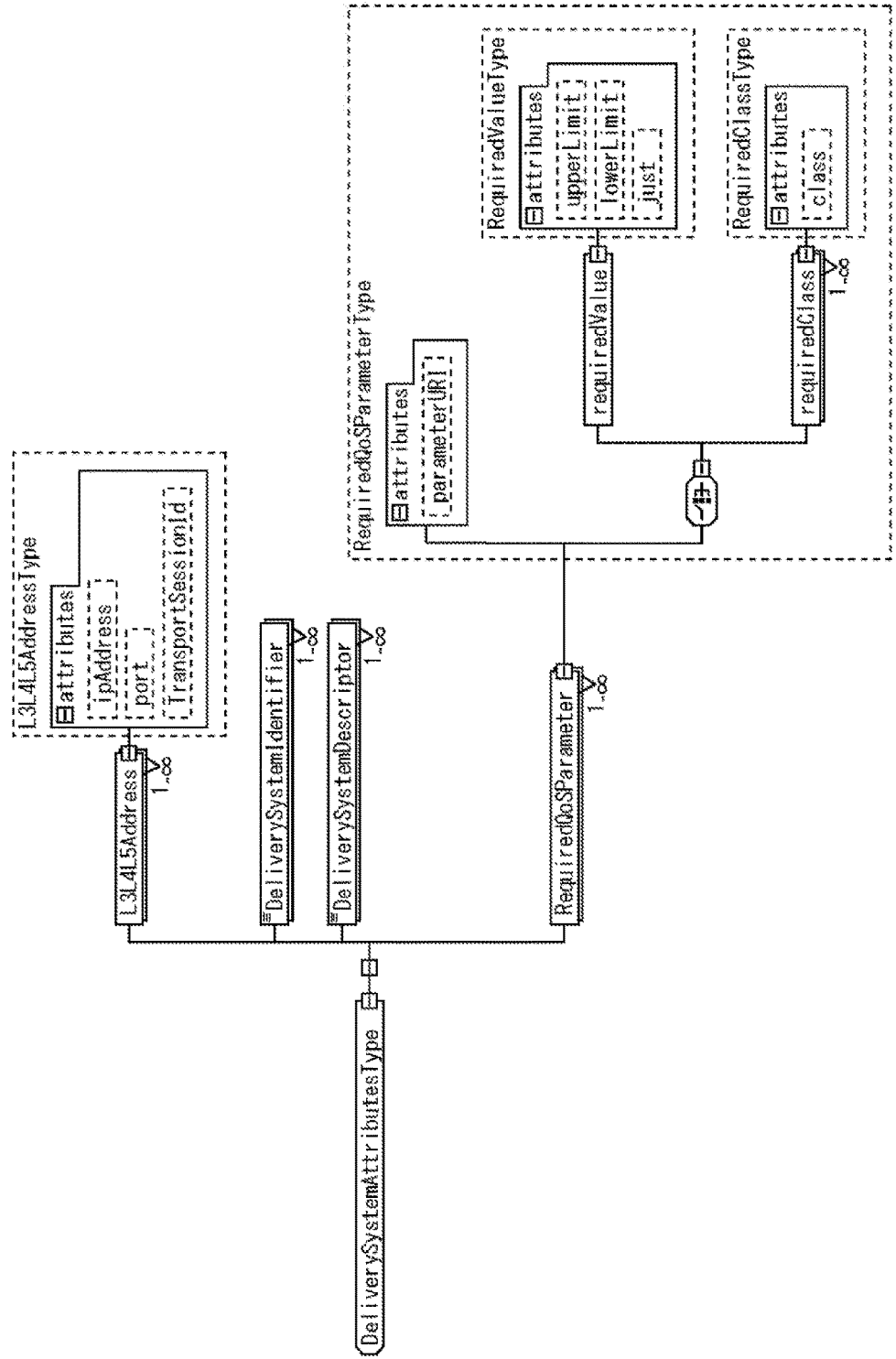
FIG. 11 is a diagram illustrating a data structure of a ServiceLocation element designated by a serviceLocationAttributeUrl attribute.

FIG. 11 illustrates a hierarchical structure of an XML schema below DeliverySystemAttributes illustrated in FIG. 10.

An L3L4L5Address is an element in which an FLUTE session stream, an IP address "ipAddress" to which an RTP multicast stream is transferred, a port number "port," and a session ID "transportSessionId" of the FLUTE are stored when an SDP is not used for resolution of a multicast stream.

A DeliverySystemIdentifier is an element in which a format identifier of a data structure of a tuning parameter employed for broadcast delivery or multicast delivery is stored. For example, "ID_DVB_T" is stored in the case of broadcast delivery by terrestrial broadcasting employed in Europe, and "ID_DVB_S" is stored in the case of broadcast delivery by satellite broadcasting.

The DeliverySystemDescriptor is an element in which a data structure (a parameter itself) of a tuning parameter specified for broadcast delivery or multicast delivery identified by the DeliverySystemIdentifier is stored. FIG. 12 illustrates an example of a data structure of a tuning parameter corresponding to broadcast delivery by terrestrial broadcasting employed in Europe. In practice, a byte sequence conforming to the above format is converted into a character string by base64 or the like and then described in the DeliverySystemDescriptor.

A RequiredQoSParameter is an element in which an identification name "parameterURI" of a QoS parameter necessary for tuning and "upperLimit," "lowerLimit," or "just (a designated value)" serving as a condition value "requestdValue" of the QoS parameter are stored.

An exemplary description of the RequiredQoSParameter will be specifically described.

For example, as a QoE parameter applied to a general streaming service, there are a delay, a delay variation, a loss (error), a throughput, and the like. Of these, when the throughput is described, RequiredQoSParameter/@parameterUR=urn:DownLinkThroughput (a unique identifier indicating a downlink throughput) is described, and when the lower limit is designated as the condition value, RequiredQoSParameter/requiredValue/@lowerLimit="3 Mbps" (which means a lower limit 3 Mbps of a downlink throughput) is described.

For example, as a representative parameter indicating a physical layer signal quality of a broadcast terminal or a mobile phone terminal when a broadcast is received or when a stream is received via a wireless LAN such as Wi-Fi, there are a parameter related to strength of a radio wave and a parameter related to a bit error rate (BER). More specifically, as the former example, there are a carrier-to-noise ratio (a CN ratio), a received signal strength indicator (RSSI), and the like. As the latter example, there are a bit error rate (a BER before/after RS) before/after a Reed Solomon (RS) error correction process (which differs according to a broadcasting/communication scheme), a transport block error rate (BLER), and the like.

Of these, when the CN ratio is described, RequiredQoSParameter/@parameterURI=urn:Carrier-ToNoiseRatio (a unique identifier indicating the CN ratio) is described, and when the lower limit is designated as the condition value, RequiredQoSParameter/requiredValue/@lowerLimit="10 dB" (which means the lower limit 10 dB of the CN ratio) is described.

Further, when the CN ratio is classified into several classes (for example, three classes) and evaluated as the condition value,
level 1 (designated by "urn:CNclass1"): $10^{-3}$ or more (defective),
level 2 (designated by "urn:CNclass2"): $10^{-5}$ or more and less than $10^{-3}$ (good), and
level 3 (designated by "urn:CNclass3"): less than $10^{-5}$ (best)
are defined, and then
RequiredQoSParameter/@parameterURI=urn:Carrier-ToNoiseRatio (a unique identifier indicating C/N) is described, and as the condition value,
RequiredQoSParameter/requiredClass/@class="urn:CNclass2"
RequiredQoSParameter/requiredClass/@class="urn:CNclass3"
(which mean that the CN ratio and the class 1 or the class 2 are necessary) are described.

As the QoS parameter, in addition to the above example, parameters illustrated in FIGS. 13 to 21 may be described.

FIG. 13 illustrates an example of a QoS parameter of DVB satellite broadcasting/cable television. FIG. 14 illustrates an example of a QoS parameter of DVB cable television. FIG. 15 illustrates an example of a QoS parameter of DVB satellite broadcasting. FIG. 16 illustrates an example of a QoS parameter of terrestrial broadcasting (DVB-T). The examples of the QoS parameter illustrated in FIGS. 13 to 16 are defined in ETSI TR 101 290 V1.2.1 (2001-05), "Digital Video Broadcasting (DVB); Measurement guidelines for DVB systems."

FIG. 17 illustrates an example of a QoS parameter of terrestrial broadcasting (DVB-T2). This parameter is defined in DVB BlueBook A14-2 (07/12), "Digital Video Broadcasting (DVB); Measurement guidelines for DVB systems; Amendment for DVB-T2 System."

FIG. 18 illustrates an example of a QoS parameter of cable television (DVB-C2). This parameter is defined in DVB BlueBook A14-3 (03/13), "Digital Video Broadcasting (DVB); Measurement guidelines for DVB systems; Amendment for DVB-C2 System."

FIG. 19 illustrates an example of a QoS parameter of other terrestrial broadcasting. This parameter is defined in NorDig Unified ver2.4.

FIG. 20 illustrates an example of a QoS parameter for a 3G mobile phone (UTRA FDD) terminal. This parameter is defined in ETSI TS 125 215 V11.0.0 (2012-11); "Universal Mobile Telecommunications System (UMTS); Physical layer; Measurements (FDD) (3GPP TS 25.215 version 11.0.0 Release 11)."

FIG. 21 illustrates an example of a QoS parameter for a 3G mobile phone (UTRA TDD) terminal. This parameter is defined in ETSI TS 125 225 V11.0.0 (2012-09); "Universal Mobile Telecommunications System (UMTS); Physical layer; Measurements (TDD) (3GPP TS 25.225 version 11.0.0 Release 11)."

FIG. 22 is a diagram illustrating an example of a QoS parameter for an LTE (E-UTRA) terminal. This parameter is defined in ETSI TS 136 214 V11.1.0 (2013-02); "LTE; Evolved Universal Terrestrial Radio Access (E-UTRA); Physical layer; Measurements (3GPP TS 36.214 version 11.1.0 Release 11)."

[Streaming Protocol Stack]

On an IP packet stream having a multicast address designated by a ServiceLocation/IPMulticastAddress element among IP packet streams transferred on an MPEG2-TS stream tuned by the information stored in the ServiceLocation/DeliverySystem element, a group of files are carried by the RTP protocol or the FLUTE protocol.

FIG. 23 illustrates a streaming protocol stack of a group of files carried on the IP packet stream.

The RTP is a protocol for transferring a real-time (synchronous) stream on an IP packet. The FLUTE protocol is a protocol for transferring a file on an IP packet and hierarchically configured as illustrated in A or B of FIG. 23. Here, MAC is a general term of a link layer protocol, and in a broadcasting system, GSE, TLV, or the like corresponds to the MAC.

[Extension of FDT]

In the FLUTE protocol, it is possible to access the files, as a file designated by a URL of Content-Location, for the first time at the stage at which all files having the same TOI are received. Thus, when a reproduction period of time is long, and a size of one file is very large as in VoD content such as a movie, a certain amount of time is necessary until all files are reconfigured by the reception side to be accessed.

On the other hand, in the streaming employing the DASH, although a size of a file of target VoD content is large, it is possible to acquire and reproduce some files in units of segments by mediaRange designation of individual HTTP requests. Thus, it is desirable that it be possible to acquire and reproduce even a file FLUTE-transferred by a broadcast-delivered or multicast-delivered IP multicast stream similarly in units of segments.

Here, in the Content-Location element of the FDT that is currently specified, it is difficult to express some files as in a sequence of BaseURL+SegmentURL mediaRange of the MPD. In this regard, the FDT is also extended to express some files.

In other words, a range attribute is introduced into the FDT to designate the Content-Location and a byte range of a file designated by a url of the Content-Location. A definition of a range-specifier (RFC2616.section.14.35.1) is applied to a syntax of the range attribute. As the range attribute, Period/AdaptationSet/Representation/SegmentList/SegmentURL/@mediaRange of the MPD can be used without change.

As the FDT is extended as described above, the terminal device 40 can adaptively switch streaming data to be acquired and reproduced, ad hoc, among HTTP delivery, broadcast delivery, and multicast delivery. Further, it is possible to secure flexibility in operating a content streaming service.

[Operation of Content Supply System 20]

Next, an operation of the content supply system 20 will be described.

Figure 24:
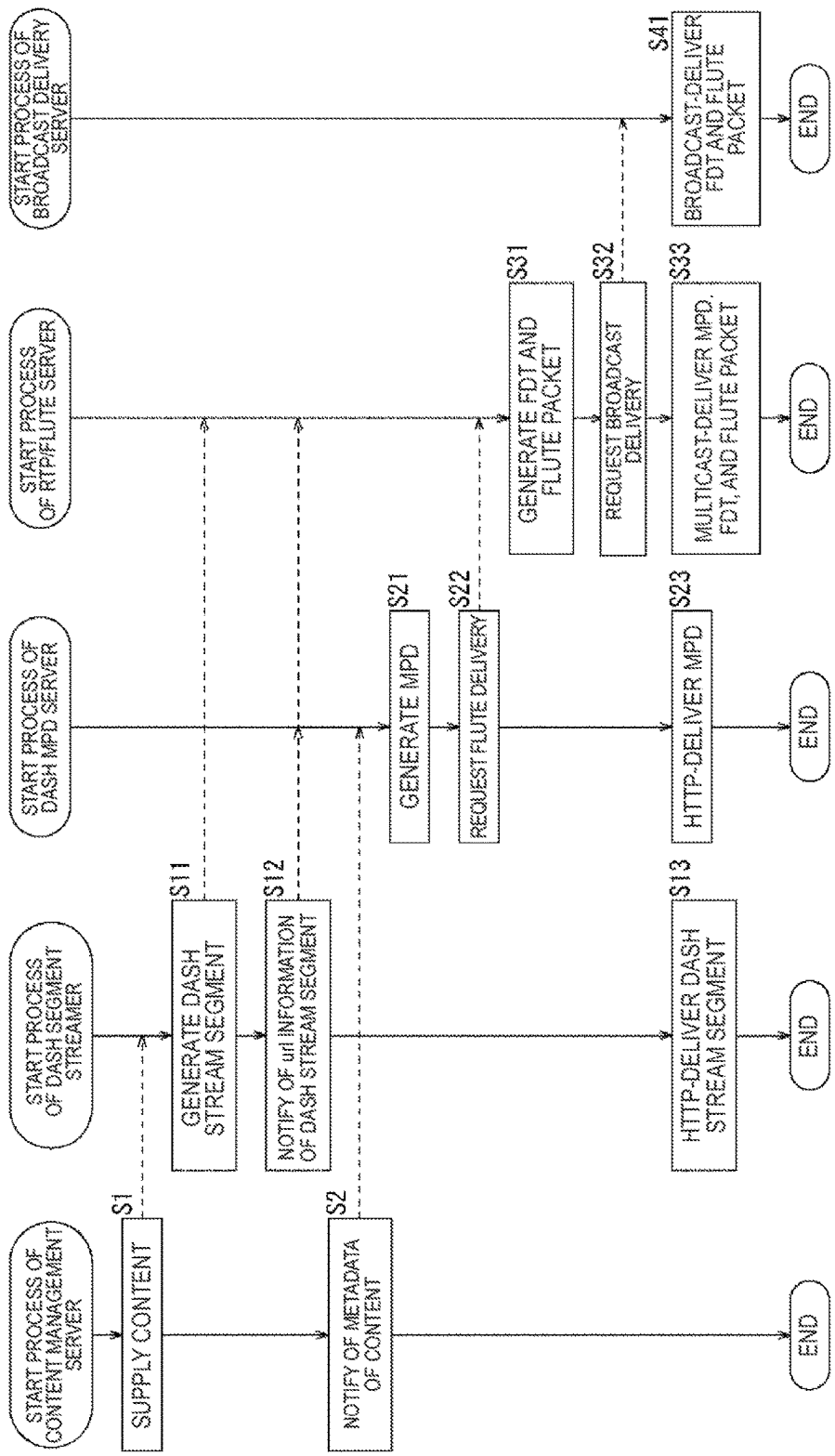
FIG. 24 is a flowchart for describing an operation of a content supply device.

FIG. 24 is a flowchart for describing an operation of the content supply device 30 of the content supply system 20.

In step S1, the content management server 31 supplies a plurality of pieces of streaming data that include content of the same subject to be supplied to the terminal device 40 of the reception side and differ in a bit rate or the like to the DASH segment streamer 32. In step S2, the content management server 31 notifies the DASH MPD server 33 of the metadata of content.

In step S11, the DASH segment streamer 32 that has been supplied with the streaming data temporally delimits the streaming data of content into periods, divides the period into segments to generate DASH stream segments, and converts each of the DASH stream segments into a file. Further, the DASH segment streamer 32 supplies the files of the DASH stream segments to the RTP/FLUTE server 34 for the multicast delivery.

In step S12, the DASH segment streamer 32 notifies the DASH MPD server 33 and the RTP/FLUTE server 34 of the address (the url information) of the supply source of the file of the DASH stream segment. Thereafter, in step S13, the DASH segment streamer 32 starts the HTTP delivery of the files of the DASH stream segments via the Internet 1 in response to the request to the terminal device 40.

The DASH MPD server 33 that has been notified of the address of the supply source of the file of the DASH stream segment generates the MPD in step S21, and supplies the MPD to the RTP/FLUTE server 34 and requests the RTP/FLUTE server 34 to perform the delivery according to the FLUTE in step S22. Thereafter, in step S23, the DASH MPD server 33 starts the HTTP delivery of the generated MPD via the Internet 1 in response to the request from the terminal device 40.

In step S31, the RTP/FLUTE server 34 that has been supplied with the MPD from the DASH MPD server 33 generates the extended FDT based on the MPD, and generates the FLUTE packet (or the RTP packet) storing the file of the DASH stream segment supplied from the DASH segment streamer 32.

In step S32, the RTP/FLUTE server 34 supplies the generated FDT and the FLUTE packet (or the RTP packet) to the broadcast delivery server 35, and requests the broadcast delivery server 35 to perform the broadcast delivery of the FDT and the FLUTE packet (or the RTP packet). Thereafter, in step S33, the RTP/FLUTE server 34 starts the multicast delivery of the FDT and the FLUTE packet (or the RTP packet) via the Internet 1 at a predetermined timing.

In step S41, the broadcast delivery server 35 that has been supplied with the FDT and the FLUTE packet (or the RTP packet) broadcast-delivers the FLUTE packet (or the RTP packet) and the FDT via the broadcasting network 2 at a predetermined timing. The description of the operation of the content supply device 30 of the content supply system 20 is now finished.

Next, FIG. 25 is a flowchart for describing an operation until the terminal device 40 receives and reproduces content.

In step S51, the terminal device 40 that desires to receive and reproduce content accesses the DASH MPD server 33 via the Internet 1, and requests the DASH MPD server 33 to transmit the MPD. In step S61, the DASH MPD server 33 HTTP-delivers the MPD to the terminal device 40 via the Internet 1 in response to the request.

Further, when the cache server 36 on the Internet 1 is holding the MPD, instead of the DASH MPD server 33, the cache server 36 HTTP-delivers the MPD to the terminal device 40.

Further, there are cases in which the MPD is FLUTE-delivered or broadcast-delivered via the broadcasting network 2, and when the MPD is received and acquired, the process of step S51 is unnecessary.

In step S52, the terminal device 40 that has acquired the MPD acquires the ServiceLocationAttribute file based on the serviceLocationAttributeUrl attribute of the MPD, and monitors a current communication state of the terminal device 40 with reference to the RequiredQoSParameter element described in the ServiceLocationAttribute file, and selects an optimal stream to be acquired.

In step S53, the terminal device 40 issues the HTTP request based on the BaseURL and the mediaRange of the MPD corresponding to the selected stream, and requests the DASH segment streamer 32 to deliver the file of the DASH stream segment. In step S71, the DASH segment streamer 32 HTTP-delivers the corresponding file to the terminal device 40 via the Internet 1 in response to the request. Further, when the cache server 36 on the Internet 1 is holding the file, instead of the DASH segment streamer 32, the cache server 36 HTTP-delivers the file to the terminal device 40.

In step S54, the terminal device 40 receives and reproduces the HTTP-delivered file. Thereafter, for example, when the communication environment of the Internet 1 has deteriorated, the terminal device 40 can adaptively switch the stream to be received. Specifically, in step S55, for example, the broadcast delivery server 35 can receive and reproduce the file of the DASH stream segment that is broadcast-delivered in step S81. Thereafter, the terminal device 40 can return to reception and reproduction of the HTTP-delivered file.

It is also possible to perform switching to receive and reproduce a stream that is HTTP-delivered from the DASH segment streamer 32 and low in the bit rate or perform switching to a stream that is multicast-delivered via the Internet 1 by the RTP/FLUTE server 34. The description of the operation of the terminal device 40 is now finished.

As described above, in the present embodiment, since the RequiredQoSParameter element is set to the ServiceLocationAttribute file that can be referenced based on the serviceLocationAttributeUrl attribute of the MPD, the terminal device 40 can perform switching to an optimal stream in a current situation.

By the way, each of the content supply device 30 and the terminal device 40 that execute a series of processes described above can be configured with hardware or can be implemented by executing software through a computer. Examples of the computer include a computer embedded in dedicated hardware and a general-purpose personal computer capable of installing various kinds of programs and executing various kinds of functions.

FIG. 26 is a block diagram illustrating an exemplary hardware configuration of the computer.

In a computer 100, a central processing unit (CPU) 101, a read only memory (ROM) 102, and a random access memory (RAM) 103 are connected with one another via a bus 104.

An input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface. The drive 110 drives a removable medium 111 such as a magnetic disk, an optical disk, a magneto-optical disk, or a semiconductor memory.

In the computer 100 having the above-described configuration, for example, a series of processes described above are performed by loading a program stored in the storage unit 108 onto the RAM 103 through the input/output interface 105 and the bus 104 and executing the loaded program through the CPU 101.

For example, the program executed by the computer 100 (the CPU 101) may be recorded in the removable medium 111 serving as a package medium or the like and provided. The program may be provided via a wired or wireless transmission medium such as a local area network, the Internet, or digital satellite broadcasting.

In the computer 100, the removable medium 111 may be mounted on the drive 110, and the program may be installed in the storage unit 108 through the input/output interface 105. The program may be received by the communication unit 109 via a wired or wireless transmission medium and installed in the storage unit 108. Moreover, the program may be installed in the ROM 102 or the storage unit 108 in advance.

Further, the program executed by the computer 100 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)
A content supply device that supplies a plurality of pieces of streaming data that include content of a same subject and differ in an attribute according to an adaptive streaming technique, the content supply device including:
  a supply unit configured to supply the plurality of pieces of streaming data to a reception side via a plurality of different networks; and
  a metafile generating unit configured to generate a metafile including an acquisition destination of a manifest file in which a QoS parameter for selecting the plurality of pieces of streaming data to be supplied by the reception side and a condition value of the QoS parameter are described and supply the metafile to the reception side.
(2)
The content supply device according to (1),
  wherein the metafile generating unit generates an extended MPD as the metafile.
(3)
The content supply device according to (1) or (2),
  wherein the plurality of different networks include at least one of the Internet, a terrestrial broadcasting network, a satellite broadcasting network, a cable television broadcasting network, a mobile broadcasting network, and a wireless LAN.
(4)
The content supply device according to any of (1) to (3),
  wherein the metafile is supplied to the reception side by HTTP delivery, FLUTE delivery, or broadcast delivery via the network.

REFERENCE SIGNS LIST 20 content supply system
30 content supply device
31 content management server
32 DASH segment streamer
33 DASH MPD server
34 FLUTE server
35 broadcast delivery server
40 terminal device
100 computer
101 CPU

The invention claimed is:

1. A content supply device that supplies a plurality of pieces of streaming data that include content of a same subject and differ in an attribute according to an adaptive streaming technique, the content supply device comprising:
  transmission circuitry configured to supply the plurality of pieces of streaming data to a receiving device via a plurality of different networks; and
  processing circuitry configured to generate a metafile including at least an acquisition location of a manifest file, the manifest file being acquired by the receiving device based on the acquisition location and including a quality of service (QoS) parameter and a condition value of the QoS parameter for at least one of the plurality of different networks, one of the at least one of the plurality of different networks being selected by the receiving device based on the QoS parameter,
  wherein the transmission circuitry is configured to supply the metafile to the receiving device.

2. The content supply device according to claim 1, wherein the processing circuitry is configured to generate an extended media presentation description (MPD) as the metafile.

3. The content supply device according to claim 2, wherein the plurality of different networks includes at least one of the Internet, a terrestrial broadcasting network, a satellite broadcasting network, a cable television broadcasting network, a mobile broadcasting network, or a wireless LAN.

4. The content supply device according to claim 2, wherein the metafile is supplied to the receiving device by HTTP delivery, FLUTE delivery, or broadcast delivery via one of the plurality of different networks.

5. A content supply method of a content supply device that supplies a plurality of pieces of streaming data that include content of a same subject and differ in an attribute according to an adaptive streaming technique, the content supply method comprising:
  supplying, by transmission circuitry, the plurality of pieces of streaming data to a receiving device via a plurality of different networks;
  generating, by processing circuitry, a metafile including at least an acquisition location of a manifest file, the manifest file being acquired by the receiving device based on the acquisition location and including a quality of service (QoS) parameter and a condition value of the QoS parameter for at least one of the plurality of different networks, one of the at least one of the plurality of different networks being selected by the receiving device based on the QoS parameter; and
  supplying, by the transmission circuitry, the metafile to the receiving device.

6. The content supply method according to claim 5, wherein the generating comprises:
  generating an extended media presentation description (MPD) as the metafile.

7. The content supply method according to claim 6, wherein the plurality of different networks includes at least one of the Internet, a terrestrial broadcasting network, a satellite broadcasting network, a cable television broadcasting network, a mobile broadcasting network, or a wireless LAN.

8. The content supply method according to claim 6, wherein the metafile is supplied to the receiving device by HTTP delivery, FLUTE delivery, or broadcast delivery via one of the plurality of different networks.

9. A receiving device for receiving a plurality of pieces of streaming data that include content of a same subject and differ in an attribute according to an adaptive streaming technique, the receiving device comprising:
  interface circuitry configured to connect to a computer network;
  receiver circuitry configured to receive a broadcast signal; and
  processing circuitry configured to
    receive, via the interface circuitry or the receiver circuitry, a metafile including at least an acquisition location of a manifest file, the manifest file including a quality of service (QoS) parameter and a condition value of the QoS parameter for at least one of a plurality of different networks via which the plurality of pieces of streaming data is provided,
    acquire the manifest file based on the acquisition location of the manifest file included in the metafile,
    select one of the at least one of the plurality of different networks based on the QoS parameter, and
    process one of the plurality of pieces of streaming data received via the selected one of the plurality of different networks for display.

10. The receiving device according to claim 9, wherein the metafile is an extended media presentation description (MPD).

11. The receiving device according to claim 10, wherein the plurality of different networks includes at least one of the Internet, a terrestrial broadcasting network, a satellite broadcasting network, a cable television broadcasting network, a mobile broadcasting network, or a wireless LAN.

12. The receiving device according to claim 10, wherein the processing circuitry is configured to
receive the metafile by HTTP delivery, FLUTE delivery, or broadcast delivery via one of the plurality of different networks.

13. A method of a receiving device for receiving a plurality of pieces of streaming data that include content of a same subject and differ in an attribute according to an adaptive streaming technique, the method comprising:
receiving, via interface circuitry configured to connect to a computer network or receiver circuitry configured to receive a broadcast signal, a metafile including at least an acquisition location of a manifest file, the manifest file including a quality of service (QoS) parameter and a condition value of the QoS parameter for at least one of a plurality of different networks via which the plurality of pieces of streaming data is provided,
acquiring, by processing circuitry, the manifest file based on the acquisition location of the manifest file included in the metafile,
selecting, by the processing circuitry, one of the at least one of the plurality of different networks based on the QoS parameter, and
processing, by the processing circuitry, one of the plurality of pieces of streaming data received via the selected one of the plurality of different networks for display.

14. The receiving device according to claim 13, wherein the metafile is an extended media presentation description (MPD).

15. The receiving device according to claim 14, wherein the plurality of different networks includes at least one of the Internet, a terrestrial broadcasting network, a satellite broadcasting network, a cable television broadcasting network, a mobile broadcasting network, or a wireless LAN.

16. The receiving device according to claim 14, wherein the receiving the metafile comprises:
receiving the metafile by HTTP delivery, FLUTE delivery, or broadcast delivery via one of the plurality of different networks.

* * * * *